United States Patent [19]

Smale et al.

[11] Patent Number: 5,566,581
[45] Date of Patent: Oct. 22, 1996

[54] MANUAL TRANSMISSION AND IGNITION INTERLOCK

[75] Inventors: Randall D. Smale, Farmington Hills; Gary A. Novotny, Flushing, both of Mich.

[73] Assignee: Dura Automotive Systems, Inc., Troy, Mich.

[21] Appl. No.: 328,678

[22] Filed: Oct. 11, 1994

[51] Int. Cl.⁶ ..................................................... B60K 20/04
[52] U.S. Cl. ........................................ 74/475; 477/99; 70/248
[58] Field of Search .............................. 477/99; 74/475, 74/526; 70/247, 248, 252

[56] References Cited

U.S. PATENT DOCUMENTS

| | | | |
|---|---|---|---|
| 1,818,241 | 8/1931 | Moulton | 74/475 |
| 4,473,141 | 9/1984 | Mochida | 74/475 |
| 4,524,635 | 6/1985 | Hulin et al. | 74/476 |
| 4,693,135 | 9/1987 | LaRocca et al. | 74/483 R |
| 5,181,592 | 1/1993 | Pattock | 70/248 |
| 5,197,356 | 3/1993 | Kobayashi et al. | 74/475 |
| 5,226,303 | 7/1993 | Dieden et al. | 70/247 |
| 5,421,792 | 6/1995 | Kataumi et al. | 477/99 |

Primary Examiner—Charles A. Marmor
Assistant Examiner—Sherry Estremsky
Attorney, Agent, or Firm—David A. Greenlee

[57] ABSTRACT

A manual transmission and ignition interlock is provided for a vehicle having a manual transmission operated by a shift lever. A solenoid is movable between positions blocking and unblocking movement of the vehicle ignition to OFF. A latch bar carried by the shift lever is biased to a latched position and can be moved to unlatched position by a pull-up ring on the shift lever. The latch bar is cammed downward against the spring bias out of latched position when it is extended through a slot in a latch retainer when the shift lever is moved to REVERSE, and then snaps up to latch the shift lever. Another solenoid has a plunger which extends to underlie the latch bar and trap it, thus locking the latched shift lever in REVERSE. In one embodiment, bi-stable solenoids are controlled by a controller that is provided with high and low current inputs from branch circuits that include control switches operated by ignition position. The controller extends the latch solenoid when the shift lever is moved to REVERSE and the ignition is moved to ACCESSORY. This closes a switch, causing the controller to retract the ignition solenoid and enable movement to OFF. In another embodiment, a control circuit uses conventional solenoids.

15 Claims, 7 Drawing Sheets

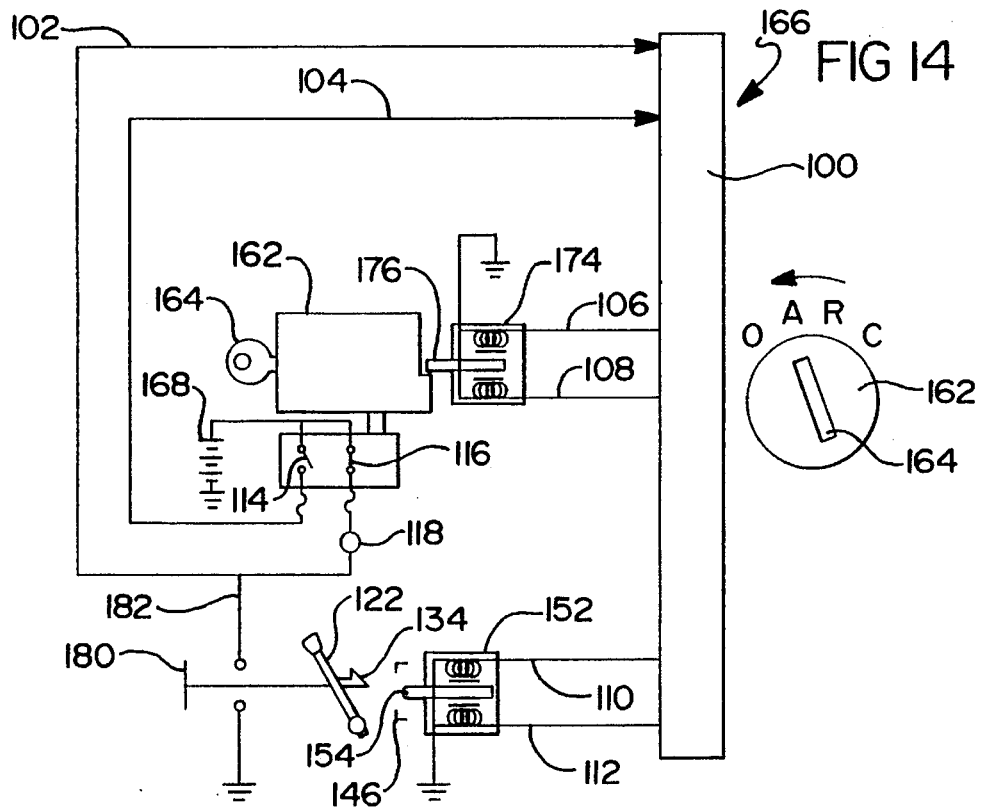
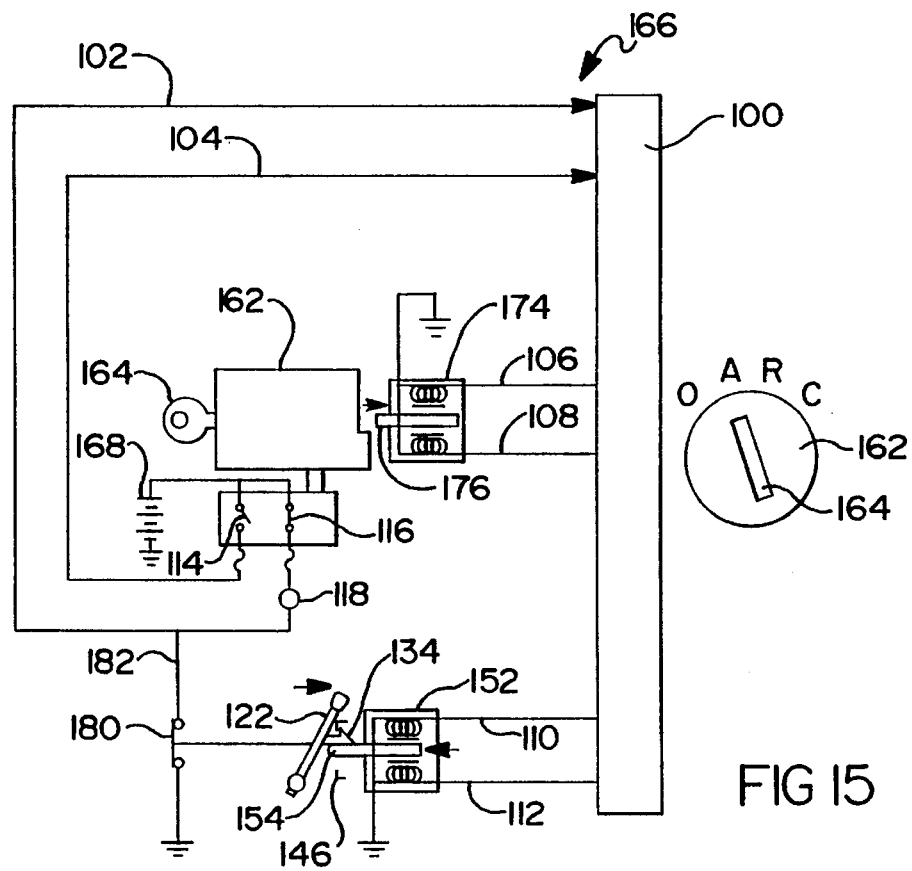

5,566,581

MANUAL TRANSMISSION AND IGNITION INTERLOCK

BACKGROUND OF THE INVENTION

This invention relates generally to vehicle manual transmissions and, more particularly, to a vehicle manual transmission and ignition interlock.

Many anti-theft systems have been developed for vehicles with automatic transmissions which prevent movement of the transmission out of PARK when the vehicle ignition is switched to OFF and the ignition key is removed. All of these systems are designed to prevent forward vehicle motion.

Since a manual transmission has no transmission position equivalent to PARK, such an anti-theft system has previously not been developed for manual transmission vehicles. However, unless the vehicle parking brake is engaged, the manual transmission shift lever can be moved to NEUTRAL or to a forward gear enable forward motion of the vehicle.

It would be desirable to provide a manual transmission and ignition interlock system for a vehicle which prevents movement of the shifter to NEUTRAL or any of the forward gears when the vehicle ignition is in the OFF position with the key removed.

SUMMARY OF THE INVENTION

It is therefore an object of this invention to provide a manual transmission and ignition interlock system for a vehicle which prevents movement of the shifter to NEUTRAL or any of the forward gears when the vehicle ignition is in the OFF position with the key removed.

In one aspect, this invention features a shift lever lock for a vehicle having a manual transmission which is controlled by a shift lever movable between a plurality of operating positions including REVERSE. The lock comprises a latch bar movably mounted on the shift lever for movement between latched and unlatched positions, means biasing the latch bar to latched position, a latch receiver mounted on the vehicle for receiving the latch bar upon shift lever movement to REVERSE to latch the shift lever, and an operator on the shift lever for moving the latch bar from latched to unlatched positions.

In another aspect, this invention features a shift lever lock for a vehicle further having an ignition movable between a RUN and non-RUN positions including OFF and including a lock device movable between lock and unlock positions to selectively lock the latch bar in latched position to prevent movement of the shift lever out of REVERSE. Control means include means responsive to the position of the ignition for operating the lock device.

Preferably, the control means include means responsive to movement of the vehicle ignition to a non-RUN position to move the lock device to lock position, an ignition blocking device having a position normally blocking movement of the ignition to OFF and operable to move to a position enabling said movement, and means responsive to movement of the lock device to lock position to enable movement of the blocking device to the position enabling movement of the ignition to OFF.

In yet another aspect, this invention features a manual transmission and ignition interlock for a vehicle having a manual transmission operated by a shift lever movable among a plurality of gear positions including REVERSE, an ignition movable among OFF, ACCESSORY and RUN positions, and a power source. The interlock comprises a first electrical device movable between positions blocking and unblocking movement of the ignition to OFF, a latch bar carried by the shift lever for movement between latched and unlatched positions, and a latch retainer mounted on the vehicle for engaging the latch bar in latched position when the shift lever is in REVERSE. A second electrical device is movable between positions blocking and unblocking movement of the latch from latched to unlatched positions to lock the lever against movement out of REVERSE and a position switch actuated by movement of the shift lever to REVERSE. Control means include an electrical circuit connecting the power source, the first and second electrical devices, the control means, the position switch and the ignition. The control means responds to the combined movement of the lever to REVERSE and movement of the ignition to ACCESSORY to cause the second electrical device to move to blocking position and cause the first electrical device to move to unblocking position, thereby locking the shift lever in REVERSE and enabling movement of the ignition to OFF.

Preferably, the interlock includes first and second control switches operated by the ignition, the first control switch being closed in the RUN position and open in the ACCESSORY and OFF positions and the second control switch being closed in the RUN and ACCESSORY positions and open in the OFF position. The first and second electrical devices are preferably bi-stable solenoids extensible to blocking position and retractable to unblocking position, the control means include a controller which responds to a low input signal to retract the first solenoid and extend the second solenoid and which responds to a high input signal to extend the first solenoid and retract the second solenoid, and the electrical circuit includes a first branch including the first control switch and a second branch including the second control switch. Each branch connects the power source and the controller to provide a low input signal to the controller when open and to provide a high input signal to the controller when closed. The second branch has a leg including the position switch connecting the second branch to ground when closed to cause the second branch to provide a low input signal even if the second control switch is closed.

In still another aspect, this invention features an interlock having a notched latch plate and a latch bar having a tapered nose ending in a latch shoulder. The tapered nose cams the latch bar out of latched position against a biasing spring as the latch bar is extended through the plate notch upon movement of the shift lever to REVERSE until the shoulder passes through the latch plate. Then the biasing spring returns the latch bar to latched position with the latch shoulder engaging the latch plate adjacent the notch. A bi-stable electrical solenoid has a plunger mounting a blocking nose operable to extend and underlie the latch bar, trapping it in latched position.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 14 is a view similar to FIG. 13, but with the ignition moved to ACCESSORY position; and FIG. 15 is a view similar to FIG. 14, but with the shifter moved to REVERSE to extend the blocking solenoid and retract the ignition solenoid.

DETAILED DESCRIPTION OF PREFERRED EMBODIMENTS

Figure 1:
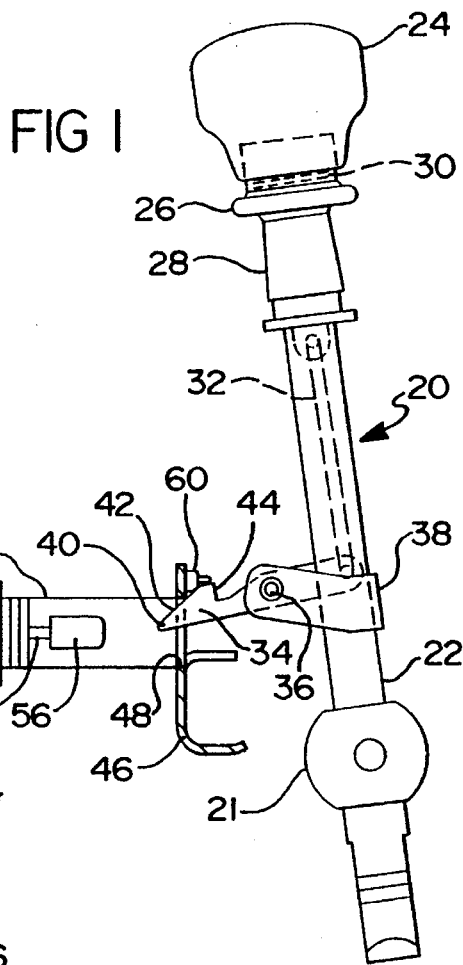
FIG. 1 is a side view of an ignition interlock for a manual transmission shifter according to this invention, with the shifter shown entering REVERSE and the blocking solenoid retracted.

Referring now to FIGS. 1–4 of the drawings, a ball shifter 20 is movable about a pivotal ball 21 among NEUTRAL, REVERSE and several FORWARD gear positions to operate a pair of cables that control a manual transmission (not shown). A ball shifter of this type is fully disclosed in U.S. Pat. No. 4,693,135 to LaRocca et al.

Shifter 20 includes a shift lever 22 that is capped by a knob 24. A pull ring 26 is mounted on a collar 28 for sliding movement upward on shift lever 22 against a biasing spring 30. A link 32 connects collar 28 to a latch bar 34 which is pivoted at 36 to a bracket 38 mounted on shift lever 22. Latch bar 34 has a nose 40 that includes a tapered ramp 42 which terminates in a latch shoulder 44.

Figure 2:
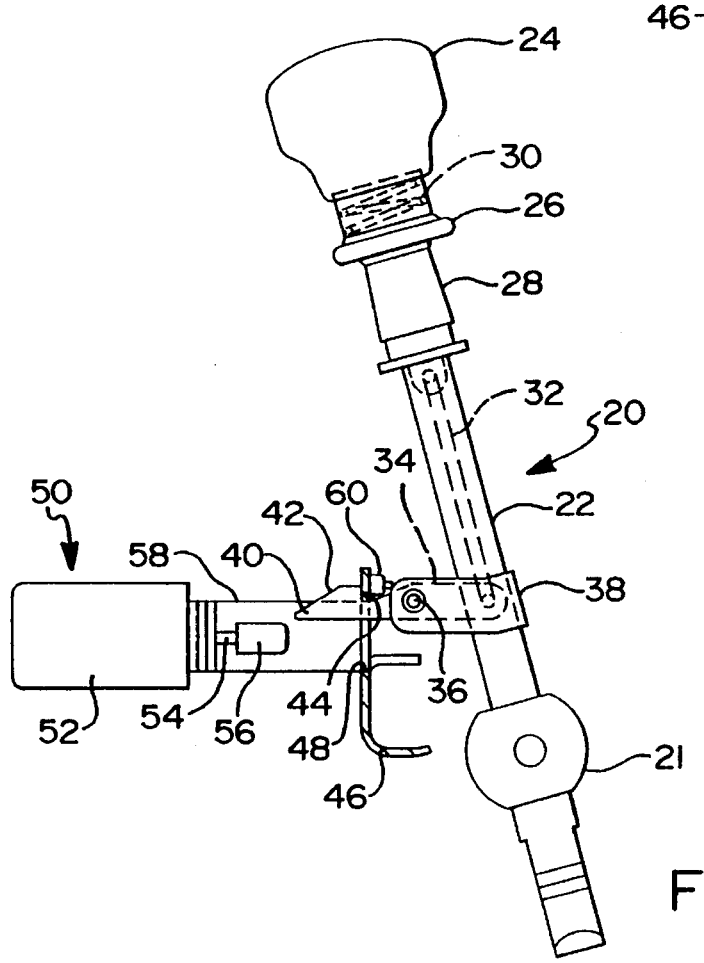
FIG. 2 is a view similar to FIG. 1, with the shifter shown in REVERSE, and latched, and the blocking solenoid retracted.

A latch retainer bracket 46 is mounted on the vehicle and includes a slot 48 for receiving latch bar 34. As shift lever 22 is moved toward REVERSE, as shown in FIG. 1, latch bar ramp 42 engages and is depressed by the top of retainer bracket slot 48, which pivots latch bar 34 to lift link 32 and compress spring 30. Upon further movement of shift lever 22 into REVERSE, as shown in FIG. 2, latch bar nose 40 clears the top of retainer bracket slot 48. This enables spring 30 to lower link 32 and pivot latch bar 34 upward into contact with the top of retainer bracket slot 48. In this position, latch shoulder 44 retainer engages bracket 46 to latch shift lever 22 in REVERSE.

Figure 3:
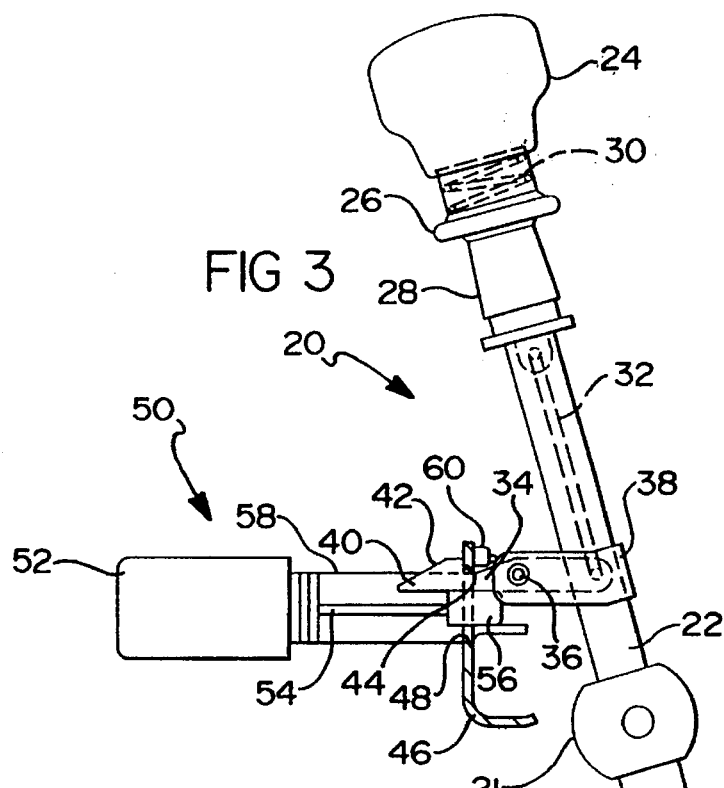
FIG. 3 is a view similar to FIG. 2, but with the shifter latched and the blocking solenoid extended to prevent shifter movement out of REVERSE.

A lock device 50 includes a solenoid 52 having a plunger 54 that mounts an end fitting 56. A leg 58 of bracket 46 mounts solenoid 52 so that plunger 54 moves between a retracted position (FIGS. 1, 2 and 4) and an extended position extending partially into slot 48, as shown in FIG. 3. An electrical position switch 60 is also mounted on retainer bracket 46 for engagement and operation by shift lever bracket 38 when shift lever 22 is moved to REVERSE, as shown in FIGS. 2 and 3. Operation of solenoid 50 and switch 60 in relation to ignition and shifter operation will be described later.

Figure 4:
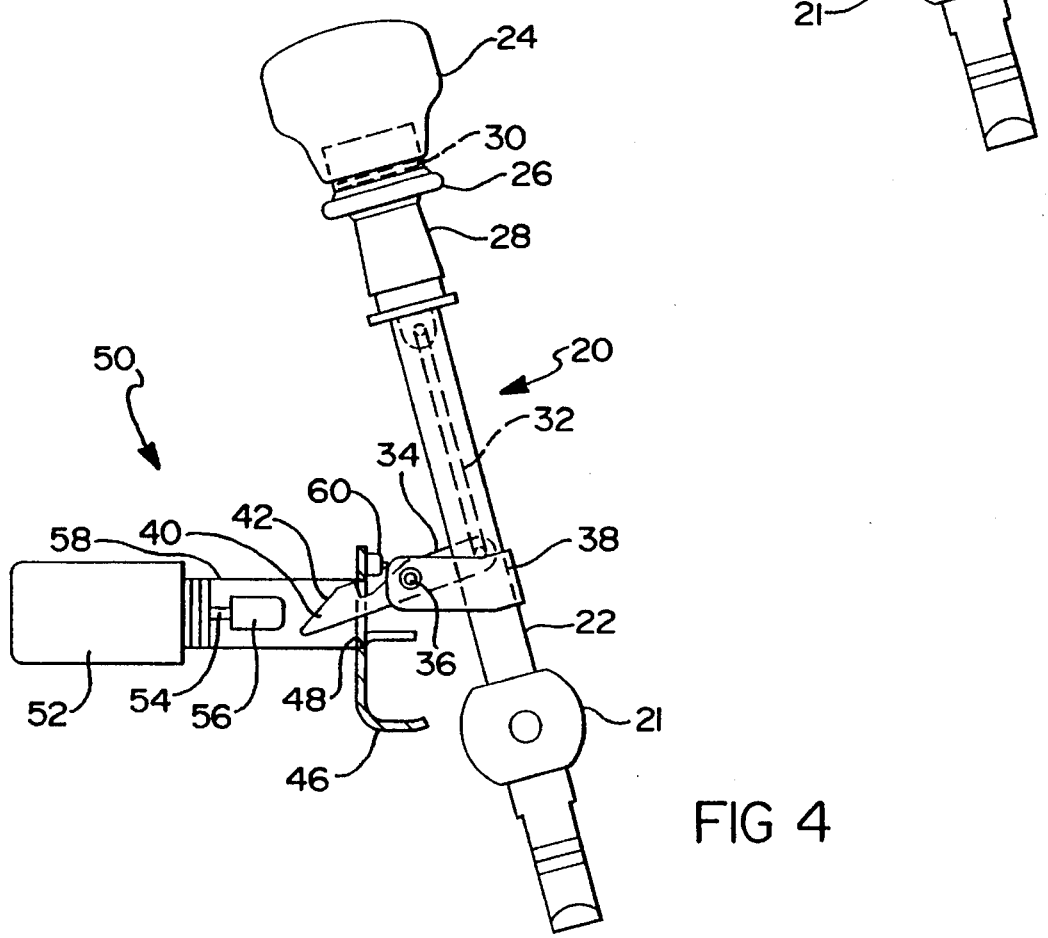
FIG. 4 is a view similar to FIG. 3, but with the blocking solenoid retracted and the shifter unlatched to enable movement out of REVERSE.

As shown in FIG. 3, when shift lever 22 is latched, extension of solenoid plunger 54 moves end fitting 56 beneath latch bar nose 40, thus locking latch bar 34 in its latched position. This locks shift lever 22 in REVERSE until solenoid plunger 54 is retracted. Upon plunger 54 retraction, since shift lever 22 is merely latched, as shown in FIG. 2, it can be moved out of REVERSE by manually pulling up on pull ring 26. This action compresses spring 30, lifts link 32 and pivots latch bar 34 so that latch shoulder 44 clears the top of retainer bracket 46, as shown in FIG. 4. Shift lever 22 can now be moved out of REVERSE and through NEUTRAL to any other operative position in a well-known manner. During subsequent vehicle operation, movement of shift lever 22 into REVERSE will automatically actuate latch bar 34, and pull ring 26 must be pulled up to move shift lever 22 out of REVERSE.

FIGS. 5–11 are a sequence of schematic illustrations of operation of one embodiment of a manual transmission and ignition interlock according to this invention. Shift lever 22, latch lever 34, solenoid 52, plunger 54 and end fitting are shown, as is a vehicle ignition 62 and ignition key 64 which can only be removed in the OFF position.

A control circuit 66 includes a source of power 68 connected by a line 70 and a branch line 72 to an ignition blocking solenoid 74 having a plunger 76. A line 78 connects solenoid 74 through a switch 80, which is operated by blocking solenoid 52, and a line 82 to a line 84 which connects blocking solenoid 52 to ground. Line 70 also connects to an ignition-operated three-position switch 86, which is movable among terminals 88, 90 and 92. Terminal 88 connects to a line 94 leading to blocking solenoid 52, and corresponds to an ignition RUN position. Terminal 90 connects to a line 96, which connects through shift position switch 60 to line 94, and corresponds to an ignition ACCESSORY position. Terminal 92 is dead, and corresponds to an ignition OFF and locked position.

Figure 5:
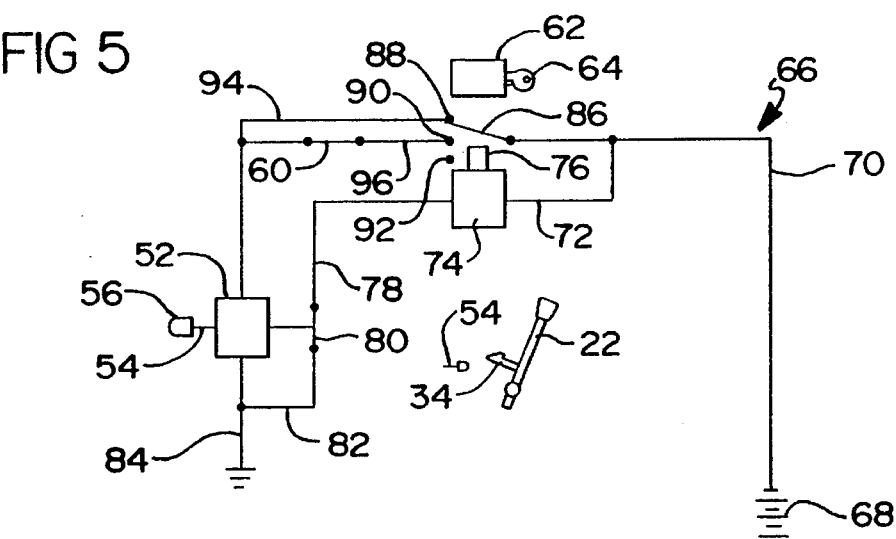
FIG. 5 is a schematic of one embodiment of an electrical control circuit for a manual transmission and ignition interlock system according to this invention, with the shifter shown out of REVERSE, the blocking solenoid retracted, the ignition in RUN position, and the ignition solenoid extended.

Solenoid 52 is spring-extended and power-retracted, while solenoid 74 is power-extended and spring-retracted. When plunger 76 is extended, ignition 62 cannot be moved to OFF position and key 64 cannot be removed. Switch 60 is normally closed and is opened by movement of the shift lever 22 to REVERSE. FIG. 5 shows the circuit when ignition 62 is in RUN position, and the shift lever 22 is out of REVERSE. As such, a circuit is completed through line 70, switch 86 and line 94 to power solenoid 52 and maintain plunger 54 retracted, enabling shift lever 22 to be freely moved into and out of reverse. This closes switch 80 to complete a circuit via lines 70, 72, 78 and 82 and switch 80 to power solenoid 74 and maintain plunger 76 extended, preventing removal of key 64 from ignition 62.

Figure 6:
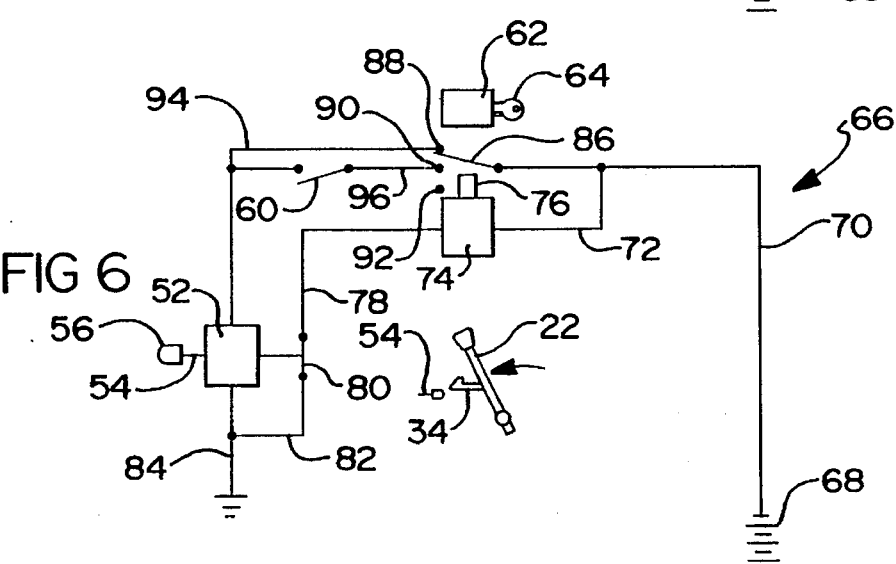
FIG. 6 is a view similar to FIG. 5, with the shifter shown latched in REVERSE, as in FIG. 2, the blocking solenoid retracted, the ignition in RUN position, and the ignition solenoid extended.
Figure 7:
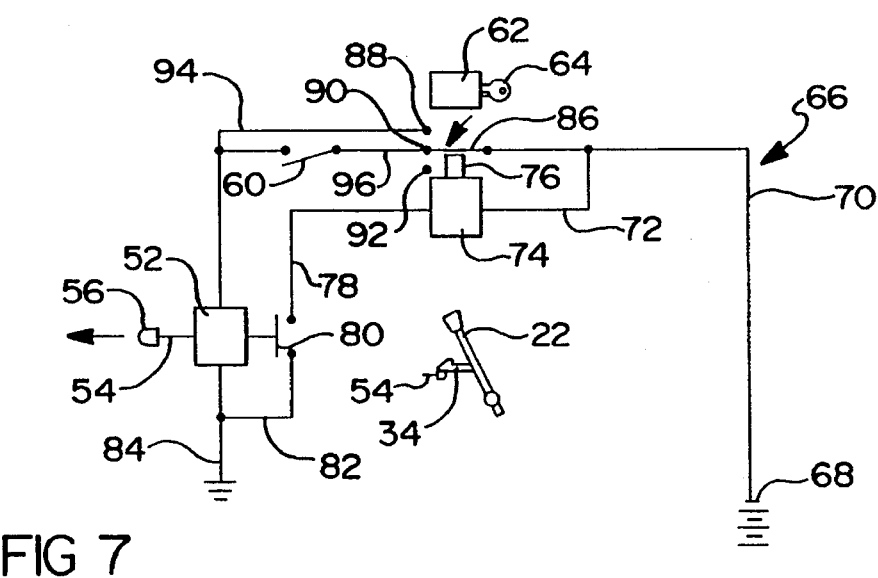
FIG. 7 is a view similar to FIG. 6, with the blocking solenoid extended to lock the latched shifter in REVERSE, as in FIG. 3, and the ignition moved to ACCESSORY position.
Figure 8:
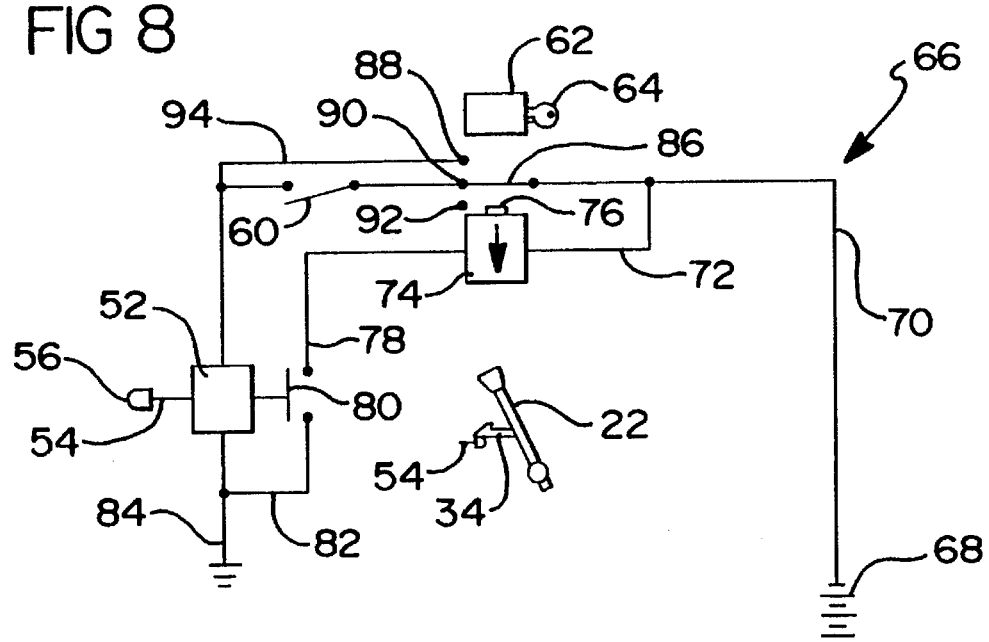
FIG. 8 is a view similar to FIG. 7, with the ignition solenoid retracted.
Figure 9:
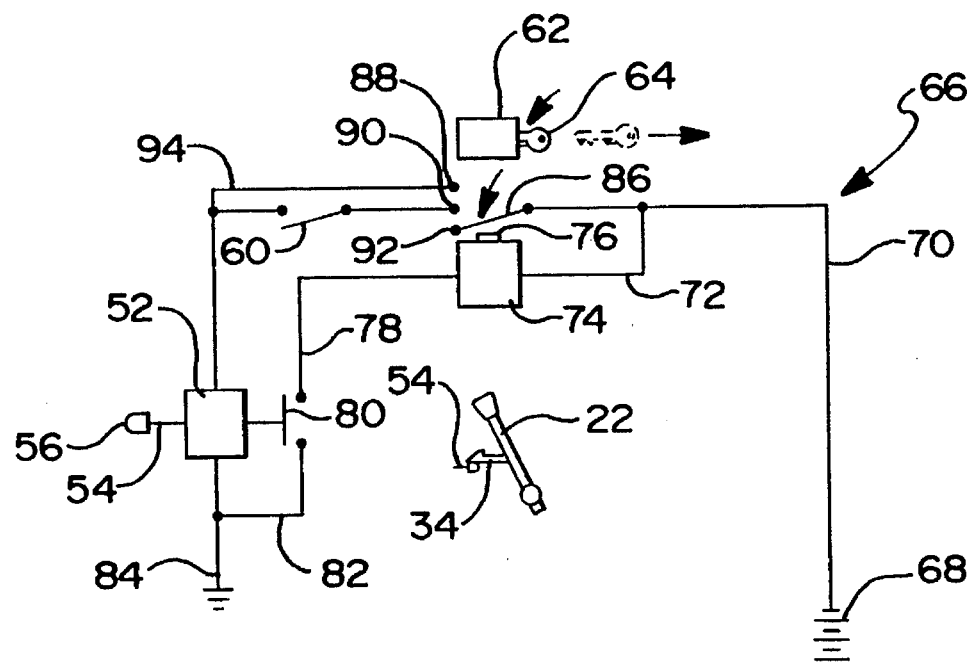
FIG. 9 is a view similar to FIG. 8, with the ignition moved to OFF position.

The effect on control circuit 66 of moving shifter 22 to the FIG. 2 REVERSE position is shown in FIG. 6. Shifter 22 opens switch 60, as shown. Subsequent movement of switch 86 to terminal 90 by moving ignition 62 to ACCESSORY breaks the circuit to cut off power to solenoid 52. Plunger 54 is then spring extended, which opens switch 80, breaking the circuit and cutting off power to solenoid 76, as shown in FIG. 7. With solenoid 74 unpowered, plunger 76 will spring-retract, as shown in FIG. 8. Since switch 86 is now unblocked by retraction of plunger 76, it can be moved to terminal 92 by moving ignition 62 to OFF. This enables removal of ignition key 64, as shown in FIG. 9. With no power to solenoid 54, extended plunger 54 locks shift lever 22 in REVERSE, as shown in FIG. 3.

Figure 10:
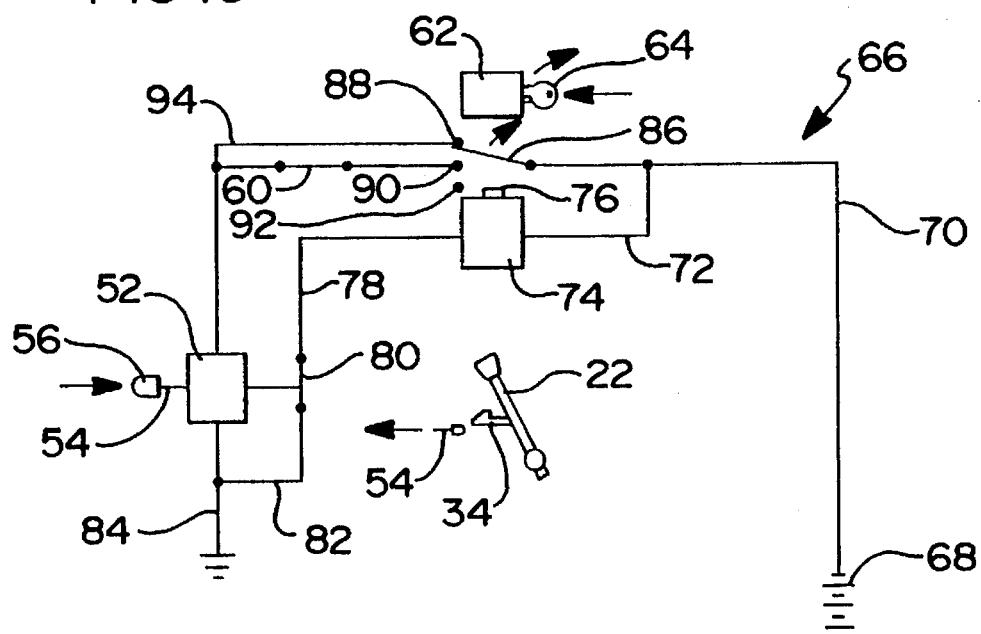
FIG. 10 is a view similar to FIG. 9, but with the ignition moved to RUN position to retract the blocking solenoid to unlock the shifter.
Figure 11:
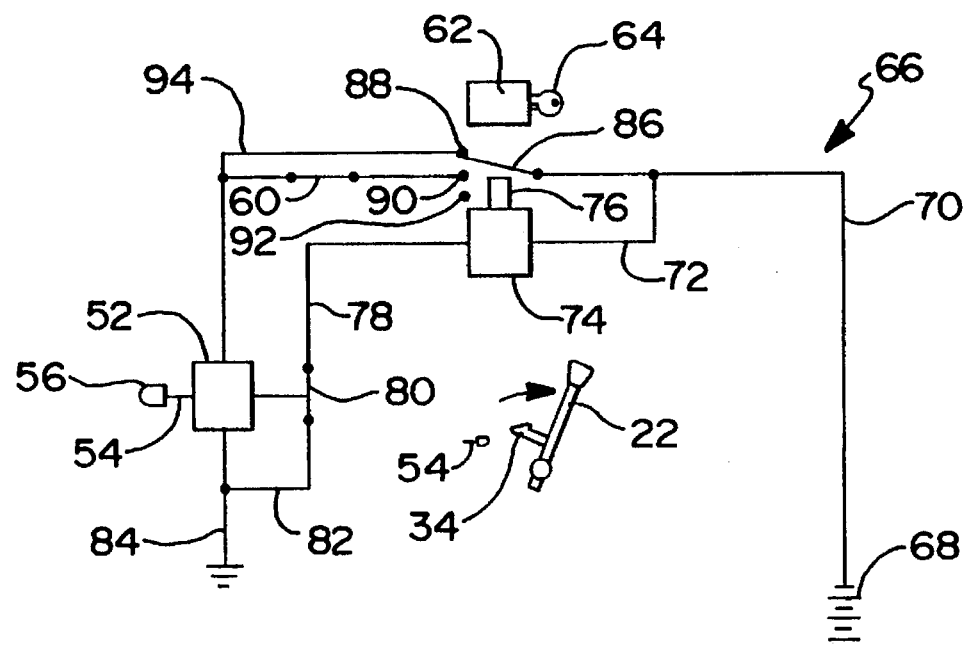
FIG. 11 is a view similar to FIG. 10, but with the unlocked and unlatched shifter moved out of REVERSE, as in FIG. 4.

After key 64 is reinserted and, movement of ignition 62 to CRANK position to start the vehicle engine will move switch 86 to RUN, as shown in FIG. 10. This again powers solenoid 52, retracting blocking plunger 54 and closing switch 80. As shown in FIG. 11, this powers solenoid 74 to extend plunger 76 to its blocking position. Since plunger 54 is retracted, shift lever 22 can be unlatched by lifting pull ring 26 (FIG. 4) for movement to any operating position to operate the vehicle.

Figure 12:
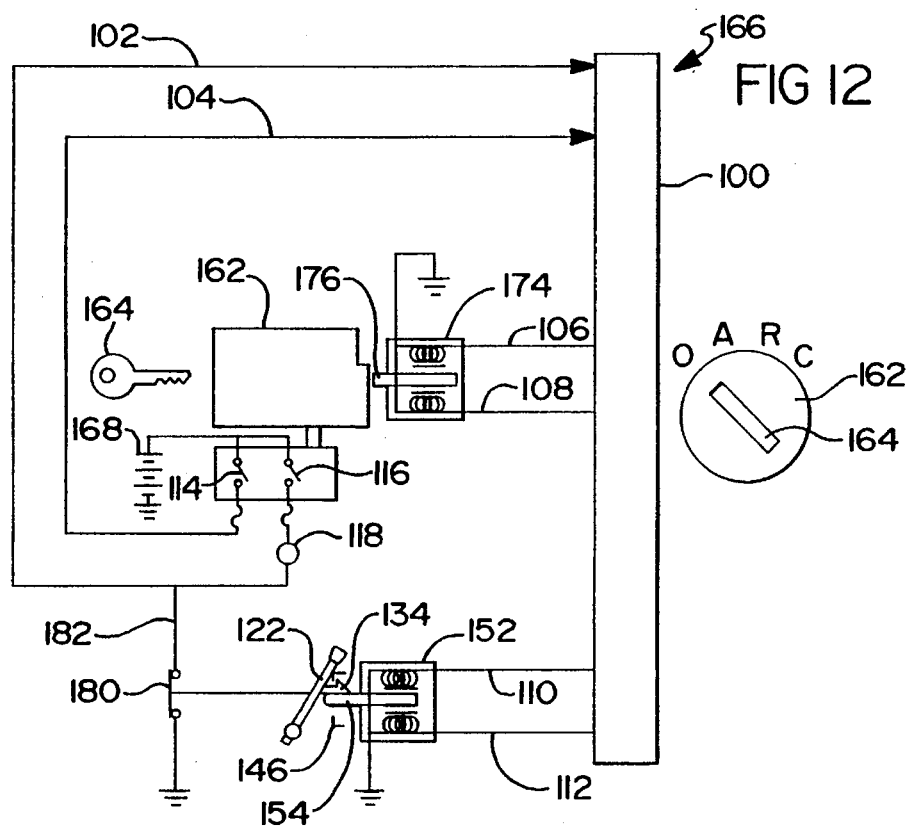
FIG. 12 is a schematic of another embodiment of an electrical control circuit for a manual transmission and ignition interlock system according to this invention, with the blocking solenoid extended to lock the shifter in REVERSE, the ignition in OFF position, and the ignition solenoid retracted.

Another embodiment of this invention is shown schematically in FIGS. 12 –5. Here elements identical or similar to those of the FIGS. 5–11 embodiment are designated by the same reference numeral increased by 100. Hence, circuit 166 includes solenoids 152 and 174 having plungers 154 and 176 which perform the same functions as plungers 54 and 76 in the FIGS. 5–11 embodiment. However, solenoids 152 and 174 are bi-stable solenoids which are powered to both extend and retract plungers 154 and 176.

As shown in FIG. 12, key 164 is inserted to operate ignition 162 which is movable among OFF (O), ACCESSORY (A), RUN (R) and CRANK (C) positions. Shifter 122 mounts a latch bar 134 which latches on a retainer bracket 146 and is locked by plunger 152 when extended, as shown in FIG. 12. Control circuit 166 includes a controller 100 including a microprocessor. Controller 100 is preferably a unit developed by General Motors Corporation which is termed a "PZM".

Controller 100 is supplied with "high" and "low" current inputs from lines 102 and 104. Controller 100 controls operation of solenoids 152 and 174 via outputs 106, 108 and 110, 112. When controller 100 receives a "high" input from either lines 102 or 104, it controls solenoid 174 to extend plunger 176 and controls solenoid 152 to retract plunger 156. When controller 100 receives a "low" current input from both lines 102 and 104, it controls solenoid 174 to retract plunger 176 and controls solenoid 152 to extend plunger 156.

A pair of switches 114 and 116 are operated by ignition 162. Switches 114 and 116 are both open in ignition OFF position and are both closed in RUN and CRANK positions. Switch 114 is open and switch 116 is closed in ACCESSORY position. Input line 104 connects through switch 114 to power source 168. Input line 104 connects through a backup light 118 and switch 116 to power source 168. A branch line 182 including shifter switch 180 connects input line 104 to ground. Operation of circuit 166 will now be described.

In the vehicle parked position of FIG. 12, ignition 162 is OFF, opening both switches 114 and 116. Shift lever 122 is latched and locked in REVERSE by extended plunger 154, closing switch 180. As a result of this circuit condition, both input lines 102 and 104 provide a low current input to controller 100, causing retraction of plunger 176 and extension of plunger 154. In this circuit condition, key 164 can be removed.

Figure 13:
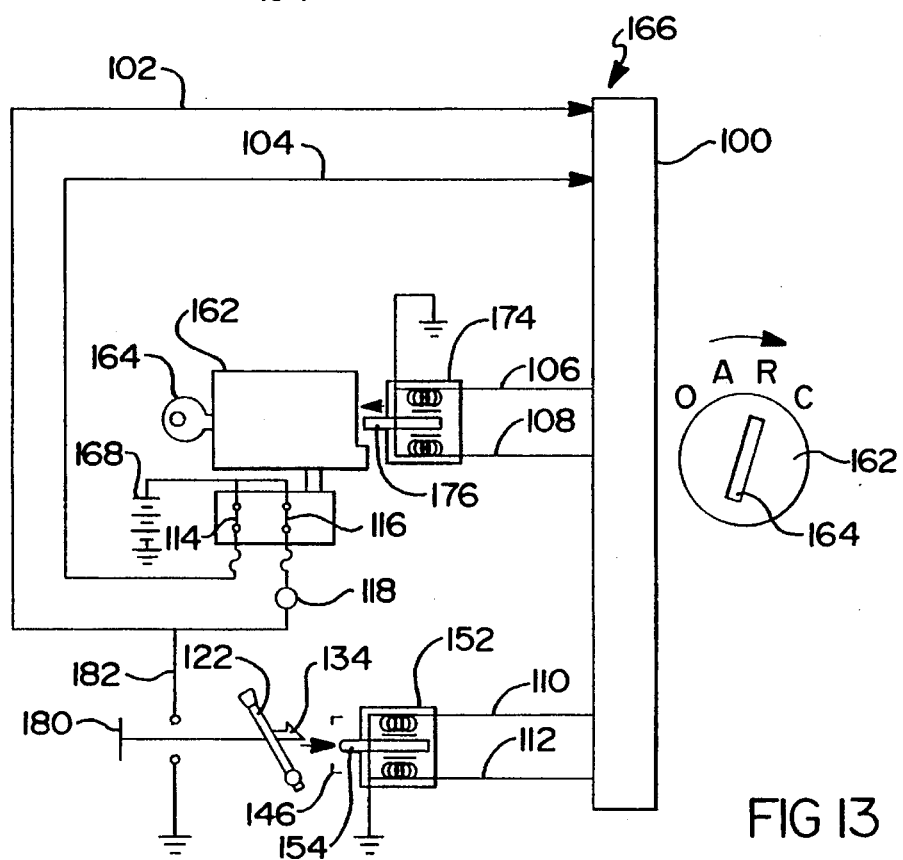
FIG. 13 is a view similar to FIG. 12, but with the ignition moved to RUN position to retract the blocking solenoid to unlock the shifter, and the shifter unlatched and moved out of REVERSE to extend the ignition solenoid.

To operate the vehicle, key 164 is reinserted and ignition 162 is moved to CRANK to start the vehicle, then to RUN, as shown in FIG. 13. This closes both switches 114 and 116, providing a high current input to controller 100, which operates solenoid 174 to extend plunger 176, blocking key removal. Controller also operates solenoid 152 to retract plunger 154, enabling operation of latch bar 134 to unlatch shift lever 122 for movement out of REVERSE to transmission operating positions. The vehicle can now be operated in normal fashion.

When it is desired to park and leave the vehicle, ignition 162 is moved to ACCESSORY, as shown in FIG. 14. This opens switch 114, while switch 116 remains closed, sending one low and one high current input to controller 100, which maintains plungers 154 and 176 as before, as long as shift lever 122 is not in REVERSE.

The effect of subsequent movement of shift lever 122 to REVERSE is shown in FIG. 15. This action will latch shift lever 122, as previously described. This will also close switch 180, which grounds line 104, producing a low current input to controller 100, even though switch 116 remains closed. Since controller 100 now receives low current inputs from lines 102 and 104, it controls solenoid 152 to extend plunger 154 to lock shift lever 122 in REVERSE. Controller 100 will control solenoid 174 to retract plunger 176, enabling movement of ignition 162 to OFF, as shown in FIG. 12, and removal of key 164. In OFF, switch 114 is open, maintaining the low input to controller 100.

Reinsertion of key 164 and movement of ignition 162 to ACCESSORY closes switch 114. Even though line 102 remains grounded by closure of switch 180, a high current input is supplied controller 100 via line 104. This maintains plunger 154 extended to keep-shift lever 122 locked in REVERSE. To release shift lever 122, ignition 162 must be moved to RUN or CRANK, thus closing both switches 114 and 116. This supplies high current inputs to controller 100, as shown in FIG. 13.

While only preferred embodiments have been illustrated and described, obvious modifications thereof are contemplated within the scope of this invention and the following claims.

We claim:

1. A shift lever lock for a vehicle having a manual transmission controlled by a shift lever movable between a purality of operating positions including REVERSE, comprising a latch bar movably mounted on the shift lever for movement between latched and unlatched positions, means biasing the latch bar to latched position, a latch receiver mounted on the vehicle for receiving the latch bar upon shift lever movement to REVERSE to latch the shift lever, an operator on the shift lever for moving the latch bar from latched to unlatched positions, and a lock device operable to lock the latch bar in latched position to prevent movement of the shift lever out of REVERSE.

2. The shift lever lock of claim 1, wherein the receiver is a notched latch plate and the latch bar has a tapered nose ending in a latch shoulder, the tapered nose camming the latch bar out of latched position against the biasing means as the latch bar is extended through the plate notch upon movement of the shift lever to REVERSE until the shoulder passes through the latch plate, whereupon the biasing means returns the latch bar to latched position with the latch shoulder engaging the latch plate adjacent the notch.

3. The shift lever lock of claim 1, wherein the lock device is an electrical solenoid having a plunger mounting a blocking nose operable to extend and underlie the latch bar, trapping it in latched position.

4. The shift lever lock of claim 3 further including control means for controlling operation of the lock device.

5. A shift lever lock for a vehicle having a manual transmission controlled by a shift lever movable between a plurality of operating positions including REVERSE and an ignition movable between a RUN and non-RUN positions including OFF, comprising a latch bar movably mounted on the shift lever for movement between latched and unlatched positions, means biasing the latch lever to latched position, a latch receiver mounted on the vehicle for receiving the latch bar upon shift lever movement to REVERSE to latch the shift lever, an operator for moving the latch bar from latched to unlatched positions, a lock device movable between lock and unlock positions to selectively lock the latch bar in latched position to prevent movement of the shift lever out of REVERSE, and control means including means responsive to the position of the ignition for operating the lock device.

6. The shift lever lock of claim 5, wherein the control means include means responsive to movement of the vehicle ignition to a non-RUN position to move the lock device to lock position.

7. The shift lever lock of claim 6, including an ignition blocking device having a position normally blocking movement of the ignition to OFF and operable to move to a position enabling said movement.

8. The shift lever lock of claim 7, wherein the control means include means responsive to movement of the lock device to lock position to enable movement of the blocking device to the position enabling movement of the ignition to OFF.

9. A shift lever lock for a vehicle having a manual transmission controlled by a shift lever movable between a plurality of operating positions including REVERSE and an ignition movable between a RUN and non-RUN positions including OFF, comprising a lock device movable to a position locking the shift lever in REVERSE and control means responsive to movement of the ignition to a non-RUN position to operate the lock device to lock position when the shift lever is in REVERSE.

10. The shift lever lock of claim including an ignition blocking device having a position normally blocking movement of the ignition to OFF and the control means include means responsive to movement of the lock device to locking position to move the blocking device out of blocking position to enable movement of the ignition to OFF.

11. A manual transmission and ignition interlock for a vehicle having a manual transmission operated by a shift lever movable among a plurality of gear positions including REVERSE, an ignition movable among OFF, ACCESSORY and RUN positions, and a power source, comprising a first electrical device movable between positions blocking and unblocking movement of the ignition to OFF, a latch bar carried by the shift lever for movement between latched and unlatched positions, a latch retainer mounted on the vehicle for engaging the latch bar in latched position when the shift lever is in REVERSE, a second electrical device movable between positions blocking and unblocking movement of the latch from latched to unlatched positions to lock the lever against movement out of REVERSE, a position switch actuated by movement of the shift lever to REVERSE, and control means including an electrical circuit connecting the power source, the first and second electrical devices, the control means, the position switch and the ignition, wherein the control means responds to the combined movement of the lever to REVERSE and movement of the ignition to ACCESSORY to cause the second electrical device to move to blocking position and cause the first electrical device to move to unblocking position, thereby locking the shift lever in REVERSE and enabling movement of the ignition to OFF.

12. The manual transmission and ignition interlock of claim 11, including biasing means biasing the latch bar to latched position and manual means on the shift lever for moving the latch bar to unlatched position.

13. The manual transmission and ignition interlock of claim 12, further including first and second control switches operated by the ignition, the first control switch being closed in the RUN position and open in the ACCESSORY and OFF positions and the second control switch being closed in the RUN and ACCESSORY positions and open in the OFF position, wherein the first and second electrical devices are bi-stable solenoids extensible to blocking position and retractable to unblocking position, the control means include a controller which responds to a low input signal to retract the first solenoid and extend the second solenoid and which responds to a high input signal to extend the first solenoid and retract the second solenoid, and wherein the electrical circuit includes a first branch including the first control switch and a second branch including the second control switch, each branch connecting the power source and the controller to provide a low input signal to the controller when open and to provide a high input signal to the controller when closed, with the second branch having a leg including the position switch connecting the second branch to ground when closed to cause the second branch to provide a low input signal even if the second control switch is closed.

14. The shift lever lock of claim 11, wherein the receiver is a notched latch plate and the latch bar has a tapered nose ending in a latch shoulder, the tapered nose camming the latch bar out of latched position against the biasing means as the latch bar is extended through the plate notch upon movement of the shift lever to REVERSE until the shoulder passes through the latch plate, whereupon the biasing means returns the latch bar to latched position with the latch shoulder engaging the latch plate adjacent the notch.

15. The shift lever lock of claim 14, wherein the second bi-stable solenoid has a plunger mounting a blocking nose operable to extend and underlie the latch bar, trapping it in latched position.

* * * * *